US011327601B2

(12) United States Patent
Fleck et al.

(10) Patent No.: US 11,327,601 B2
(45) Date of Patent: *May 10, 2022

(54) SERIAL COMMUNICATION METHOD AND SENSOR CONTROLLER

(71) Applicant: Wacom Co., Ltd., Saitama (JP)

(72) Inventors: David Charles Fleck, Vancouver, WA (US); Akira Ito, Chiba (JP)

(73) Assignee: Wacom Co., Ltd., Saitama (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/908,334

(22) Filed: Jun. 22, 2020

(65) Prior Publication Data

US 2020/0319748 A1    Oct. 8, 2020

Related U.S. Application Data

(63) Continuation of application No. 16/224,402, filed on Dec. 18, 2018, now Pat. No. 10,691,254, which is a
(Continued)

(51) Int. Cl.
*G09G 5/00* (2006.01)
*G06F 3/041* (2006.01)
(Continued)

(52) U.S. Cl.
CPC .......... *G06F 3/04162* (2019.05); *G06F 3/038* (2013.01); *G06F 3/03545* (2013.01); *G06F 3/041* (2013.01); *G06F 3/0442* (2019.05)

(58) Field of Classification Search
CPC .......... G06F 2203/04808; G06F 3/017; G06F 3/03545; G06F 13/4282; G06F 2213/0042;
(Continued)

(56) References Cited

U.S. PATENT DOCUMENTS 8,884,906 B2 * 11/2014 Vembu ................ G06T 1/20
345/173
9,262,000 B2 * 2/2016 Kambhatla ......... G06F 3/04166
(Continued)

FOREIGN PATENT DOCUMENTS

JP          5762659 B1      8/2015

OTHER PUBLICATIONS

Extended European Search Report, dated Jan. 8, 2020, for European Application No. 17820195.0-1231, 9 pages.
(Continued)

*Primary Examiner* — Duc Q Dinh
(74) *Attorney, Agent, or Firm* — Seed IP Law Group LLP

(57) ABSTRACT

A serial communication method, which is performed by a device that detects a coordinate of a stylus and reports touch data including the detected coordinate to a host, includes: receiving a write command that includes data indicating a request for a descriptor; transmitting an interrupt in response to receiving of the write command; receiving a touch data transmission request, after the transmitting of the interrupt; transmitting the descriptor, in response to receiving the touch data transmission request, the descriptor including one or more report IDs and one or more report descriptors that each correspond to one of the one or more report IDs; producing the touch data and a first report including a first report ID of the one or more report IDs, in accordance with a first report descriptor corresponding to the first report ID; transmitting data indicating a size of the first report; and transmitting the first report.

20 Claims, 7 Drawing Sheets

Related U.S. Application Data continuation of application No. PCT/JP2017/023715, filed on Jun. 28, 2017.

(60) Provisional application No. 62/355,709, filed on Jun. 28, 2016.

(51) Int. Cl.
*G06F 3/044* (2006.01)
*G06F 3/0354* (2013.01)
*G06F 3/038* (2013.01)

(58) Field of Classification Search
CPC ........... G06F 2213/3812; G06F 3/0383; G06F 3/0416; G06F 3/0482; G06F 3/0488; G06F 2203/04104; G06F 3/041; G06F 3/0412; G06F 3/0414; G06F 3/045; G06F 9/3005; G06F 9/4418; G06F 11/2028; G06F 2203/04105; G06F 2203/04108; G06K 9/22; G06K 2009/226; B60K 2370/11; B60K 2370/146; B60K 2370/15; B60K 2370/193; B60K 2370/52; B60K 35/00
USPC .................................................. 345/173–175
See application file for complete search history.

(56) References Cited

U.S. PATENT DOCUMENTS

2016/0170548 A1    6/2016  Suzuki
2016/0320918 A1* 11/2016  Hara ..................... G06F 3/0418
2017/0285772 A1  10/2017  Yamamoto

OTHER PUBLICATIONS

"Human Interface Devices (HID) Information," originally retrieved on Jun. 27, 2017, from http://www.usb.org/developers/hidpage/, 2 pages; retrieved on Dec. 7, 2018.

"HID over I2C," originally retrieved on Jun. 27, 2017, from http://docs.microsoft.com/en-us/windows-hardware/drivers/hid/hid-over-i2c-guide, 1 page; retrieved on Dec. 7, 2018.

Silicon Labs, "Human Interface Device Tutorial," AN249, Rev. 0.5, Mar. 2011, 51 pages.

* cited by examiner

FIG.2

```
REPORT ID #1
 ·USING X-COORDINATE
   SIZE
   INPUT DATA TYPE
 ·USING Y-COORDINATE
   SIZE
   INPUT DATA TYPE
 ·USING PEN PRESSURE
   SIZE
   INPUT DATA TYPE

.
       .
       .

REPORT ID #2
 ·USING X-COORDINATE
   SIZE
   INPUT DATA TYPE
 ·USING Y-COORDINATE
   SIZE
   INPUT DATA TYPE

.
       .
       .

REPORT ID #k
   SIZE
   FEATURE DATA TYPE
REPORT ID #k+1
   SIZE
   FEATURE DATA TYPE

.
       .
       .
```

100

FIG.5
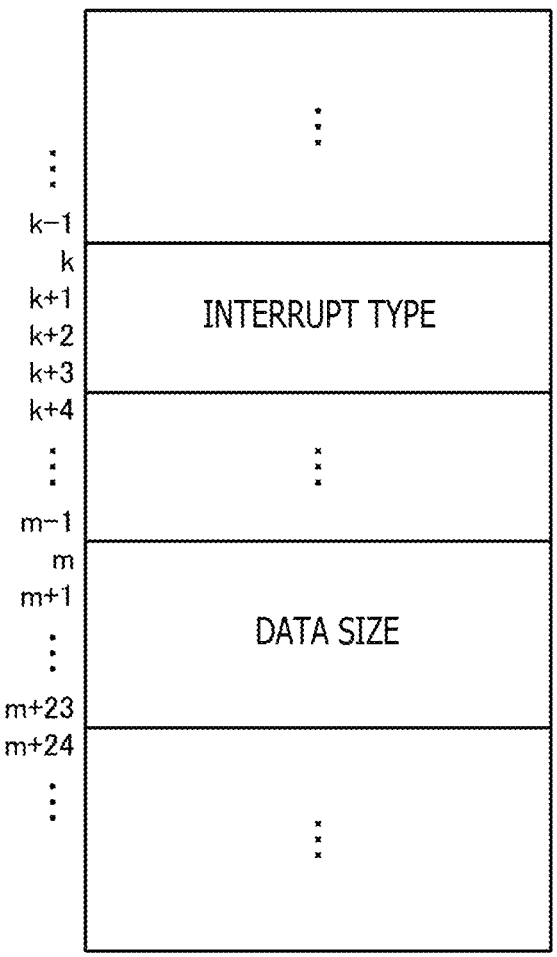
TOUCH DATA
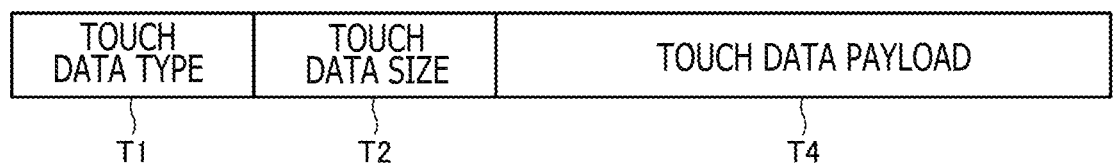
FIG.6

SERIAL COMMUNICATION METHOD AND SENSOR CONTROLLER

BACKGROUND

Technical Field

The present disclosure relates to a serial communication method and a sensor controller and, more particularly, to a sensor controller configured to be able to detect a position of a stylus and/or a finger touch and a serial communication method performed between the sensor controller and a host processor.

Background Art

Styluses employing various schemes have recently been available each as a tool for inputting by handwriting on an electronic device. Among these, a stylus called "active stylus" includes a power source unit and a signal processing circuit, and is configured to supply a charge that corresponds to a signal produced by the signal processing circuit to an electrode disposed in the vicinity of the tip of the stylus. The charge supplied to the electrode generates a predetermined electric potential (or electric field) in the space in the vicinity of the pointed position of the stylus, and an optional signal is transmitted. The signal transmitted in this manner includes, in addition to a position signal that is a burst signal to inform of the position of the stylus, various types of data such as pen pressure data indicating a value of the pen pressure detected by the stylus, data indicating a turned-on state or a turned-off state of each of operational buttons disposed on the side face and in the end portion of the stylus, and a specific ID that is written in advance in the stylus.

A sensor controller is a device that is incorporated in an electronic apparatus such as a tablet terminal, and is connected to a touch sensor that includes a group of electrodes including plural electrodes arranged in a matrix. When the stylus generates the predetermined electric potential (or electric field) in the space in the vicinity of the pointed position, a charge corresponding to the electric potential (or electric field) is induced in the group of electrodes. The sensor controller detects the signal transmitted by the stylus by detecting for each of the electrodes variation of the amount of the charge induced in this manner, and derives the position of the stylus based on the position of the electrode from which the signal is detected, the level of the detection, and the like. The sensor controller receives the data transmitted by the stylus by decoding the detected signal.

The sensor controller also detects a position of a finger touch by detecting variation of a capacitance that is generated by contact of a finger with the group of electrodes. Especially, the detection of the active stylus and the detection of the finger touch are performed using the same group of electrodes.

The sensor controller already detecting the stylus or the finger touch transmits touch data that includes coordinate data indicating the position of the detected stylus or the detected finger touch and the data transmitted by the stylus, to a host processor. This transmission is realized using a signal based on, for example, a USB (Universal Serial Bus) (see Non-Patent Document 1).

Prior to the transmission of the touch data, the sensor controller needs to notify the host processor of data that indicates the structure of the touch data and the format of a feature (various types of setting information for the sensor controller such as the maximal number of simultaneously detectable touches) supported by the sensor controller (hereinafter, referred to as "descriptor"). In the case where the USB is used in the communication between the sensor controller and the host processor, this notification is performed by a series of processes called "enumeration."

An overview will be described for the notification of the descriptor by the enumeration. After the communication by a lower layer between the host processor and the sensor controller is established, the host processor first issues a descriptor obtaining command (Get_Descriptor). The "descriptor" as used herein is data that indicates setting information and the like of the peripheral devices, and the "descriptor" transmitted by the sensor controller to the host processor is a type of the above.

The sensor controller transmits back the descriptor as a response to the descriptor obtaining command. Sharing of the descriptor is thereby realized between the host processor and the sensor controller, and the host processor thereafter performs interpretation of the touch data transmitted by the sensor controller based on the shared descriptor.

Commands usable for the notification of the descriptor in this patent application such as "Get_Descriptor" may be provided by an interface other than the USB. For example, with HID over I2C described in Non-Patent Document 2, an obtaining command for the descriptor is prepared such that a host can also obtain a descriptor from a device and use the descriptor with the I2C, as with the USB.

PRIOR ART DOCUMENT

Non-Patent Documents

Non-Patent Document 1: "HID Information," [online], USB Implementers Forum Inc., [Searched on Jun. 27, 2017], the Internet <http://www.usb.org/developers/hidpage/>

Non-Patent Document 2: "HID over I2C," [online], Apr. 20, 2017, Microsoft Corporation, [Searched on Jun. 27, 2017], the Internet <http://docs.microsoft.com/en-us/windows-hardware/drivers/hid/hid-over-i2c-guide>

BRIEF SUMMARY

Technical Problems

The communication between the sensor controller and the host processor is however not necessarily performed using the USB or the I2C, and a case is present where no protocol usable for the notification of the descriptor in this patent application is provided depending on the used communication standard. Even in such a case, it is necessary to enable the notification of the descriptor from the sensor controller to the host processor.

An object of the present disclosure therefore is to provide a serial communication method and a sensor controller, with which a descriptor can be notified from the sensor controller to a host processor even in the case where the communication is performed between the sensor controller and the host processor in accordance with a standard that does not provide any command usable for notification of the descriptor.

The data transmitted from the sensor controller to the host processor using the touch data differs depending on the stylus currently detected by the sensor controller. For example, for a stylus that transmits only the position signal, the touch data includes only the coordinate data and, for a stylus that includes plural operational buttons and a stylus that includes only one operational button, the number differs therebetween of pieces of data each indicating the turned-on state or the turned-off state of any one operational button. Furthermore, the pen pressure data and the number of bits of a specific ID differ depending on the stylus, and, for a stylus including a six-axis or a 12-axis inertia sensor, the output values thereof are included in the touch data.

Assuming that the structure of the touch data capable of supporting any stylus is defined in advance in the descriptor to support various styluses, the transmission of touch data is performed with most of the data items each having a null value (or the initial value) remaining therein, depending on the stylus. This is a cause of the pressure on the band of the communication performed between the sensor controller and the host processor, and improvement thereof has been demanded.

Another object of the present disclosure therefore is to provide a serial communication method and a sensor controller, with which the capacity of the touch data can be reduced.

Technical Solution

A serial communication method according to the present disclosure is between a device that detects a coordinate of an active stylus and that reports touch data including the detected coordinate to a host, and the host. The method includes issuing, by the host, a write command that includes data indicating a request for a descriptor, to the device, after the device performs a predetermined process for the write command, transmitting, by the device, an interrupt to the host, in response to the host detecting the interrupt, requesting, by the host, the device to transmit the touch data, and transmitting, by the device, the descriptor in response to the requesting of the device to transmit the touch data.

In the serial communication method, the descriptor may include one or more report identifiers (IDs) and one or more report descriptors each corresponding to one of the one or more report IDs.

A sensor controller according to the present disclosure detects a coordinate of and active stylus and reports touch data including the detected coordinate to the host. The sensor controller includes a terminal connected to plural electrodes, a processor; and a memory storing a program that, when executed by the processor, causes the sensor controller to: receive a write command including data that indicates a request for a descriptor, from the host, transmit an interrupt to the host in response to the write command being received, receive a touch data transmission request from the host after the interrupt is transmitted, transmit the descriptor to the host in response to the touch data transmission request being received, and transmit a report that includes the touch data produced in accordance with the descriptor, to the host.

Advantageous Effects

According to the present disclosure, a descriptor can be notified from the sensor controller to the host processor even in a case where the communication between the sensor controller and the host processor is performed based on a standard that does not provide any command usable for the notification of the descriptor because data indicating a request of the descriptor is arranged in a write command that is issued by the host to the device and the device receiving the write command transmits the descriptor using a transmission procedure for the touch data.

According to an aspect of the present disclosure, reduction of the capacity of the touch data is enabled because use of any report descriptor corresponding to the detected stylus is enabled.

BRIEF DESCRIPTION OF THE DRAWINGS

FIG. 2 is a diagram depicting the structure of a descriptor according to an embodiment of the present disclosure.

FIG. 5 is a diagram depicting the data structure of a register arranged in a memory 22 depicted in FIG. 1.

FIG. 6 is a diagram depicting the structure of touch data transmitted at S20 depicted in FIG. 2.

DETAILED DESCRIPTION

Modes for Carrying Out the Disclosure

An embodiment of the present disclosure will be described in detail below with reference to the accompanying drawings.

Figure 1:
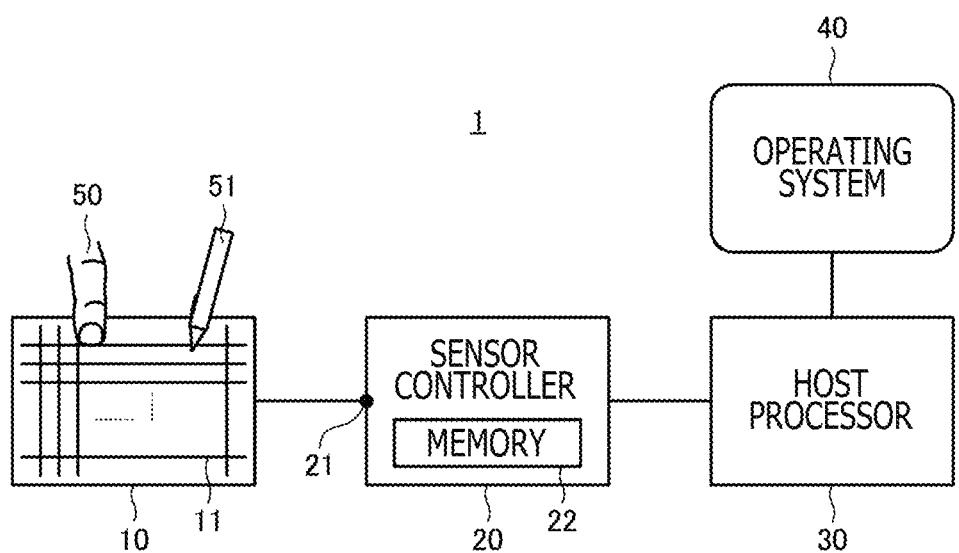
FIG. 1 is a diagram depicting a serial communication system 1 according to an embodiment of the present disclosure.

FIG. 1 is a diagram depicting a serial communication system 1 according to the embodiment of the present disclosure. As depicted in FIG. 1, the serial communication system 1 according to this embodiment includes a touch sensor 10, a sensor controller 20, a host processor 30, an operating system 40, and pointers 50 and 51.

The touch sensor 10, the sensor controller 20, the host processor 30, and the operating system 40 are each a constituent element of, for example, one tablet PC. Typically, a part of the host processor 30 and the operating system 40 are each realized by software, and the touch sensor 10, the sensor controller 20, and a part of the rest of the host processor 30 are each realized by hardware. In this case, the operating system 40 is configured to operate on the host processor 30.

The touch sensor 10 includes plural electrodes 11 that are arranged in a matrix. More specifically, the plural electrodes 11 includes plural first line electrodes that each extend in an X-direction and that are arranged at equal intervals in a Y-direction perpendicular to the X-direction, and plural second line electrodes that each extend in the Y-direction and that are arranged at equal intervals in the X-direction.

The sensor controller 20 is an integrated circuit to perform control for the touch sensor 10, and includes a terminal 21 that is connected to each of the electrodes 11 of the touch sensor 10 and a memory 22. The sensor controller 20 corresponds to a "device" that is defined in standards such as the USB, an MIPI (Mobile Industry Processor Interface), and the like that are each a general standard for data transmission in a mobile device.

The host processor 30 is a constituent element that corresponds to a "host" that is defined in the standards such as the USB, the MIPI, and the like, and is configured to be able to perform a function of relaying the communications between the sensor controller 20 and the operating system 40. The communications between the sensor controller 20 and the host processor 30 is realized by serial communications through a serial bus such as, for example, serial communications using D-DHY that is a type of physical layer defined in the MIPI.

The operating system 40 has functions of process scheduling, memory management, and the like, and also has a function as driver software for the host processor 30 or the sensor controller 20. The operating system 40 further includes software such as the one called "HID (Human Interface Device) stack" and a "device driver."

The pointer 50 specifically is a human finger. The pointer 51 specifically is a stylus and is constituted by, for example, an active stylus that has a function of receiving a signal transmitted from the touch sensor 10 and transmitting information in accordance to the signal to the touch sensor 10.

The touch sensor 10 and the sensor controller 20 are configured to perform detection of the pointer 50 and the pointer 51 in a time-sharing manner. At a timing for detecting the pointer 50, the sensor controller 20 sequentially sends predetermined signals for detecting a finger to the plural first line electrodes and detects the signals for detecting a finger using each of the plural second line electrodes. Based on the detection level of each of the signals for detecting a finger, the sensor controller 20 detects the coordinates of the pointer 50 on the touch sensor 10. On the other hand, at a timing for detecting the pointer 51, the sensor controller 20 detects the coordinates of the pointer 51 on the touch sensor 10 based on the result of the transmission and the reception of the signals to/from the pointer 51, and receives data transmitted by the pointer 51.

The detection of the pointer 51 will be described in detail. The pointer 51 is configured to perform the reception and the transmission of the signals in the time-sharing manner. At a timing for the reception, the pointer 51 receives the signal transmitted by the sensor controller 20 using the plural electrodes 11 as antennas. This signal includes a command for the pointer 51. On the other hand, at a timing for the transmission, the pointer 51 sequentially transmits a position signal that is a burst signal, and a data signal modulated by data whose transmission is instructed by the received command. The sensor controller 20 receives these signals through the plural electrodes 11 and thereby performs detection of the coordinates of the pointer 51 and reception of the data transmitted by the pointer 51.

The sensor controller 20 is configured to transmit the detected coordinates of each of the pointers 50 and 51, and the data received from the pointer 51 to the operating system 40 through the host processor 30. The data transmitted from the sensor controller 20 to the operating system 40 in this manner will hereinafter be referred to as "touch data."

The sensor controller 20 is configured to notify the operating system 40 through the host processor 30 of the structure of the touch data and data indicating a format of a feature supported by the sensor controller 20 (various types of setting information for the sensor controller 20 such as the maximal number of the number of simultaneously detectable touches) (hereinafter, referred to as "descriptor"), before performing the transmission of the touch data. The operating system 40 is configured to perform interpretation of the touch data that the sensor controller 20 transmits using the descriptor notified of as above.

FIG. 2 is a diagram depicting the structure of the descriptor 100 according to this embodiment. As depicted in FIG. 2, the descriptor 100 is text data that has the structure of the touch data and the format of the feature described therein for each report ID. An actual descriptor 100 is described using a hexadecimal notation. Report IDs #1 and #2 of four report IDs exemplified in FIG. 2 each correspond to the structure of the touch data and, being associated with each of these, the format (the size, the data type, and the like) of various types of data (such as the X-coordinate, the Y-coordinate, the and the pen pressure value) regularly transmitted is defined. On the other hand, report IDs #k and #k+1 each correspond to the feature and, being associated with each of these, the format (such as the size and the data type) of the feature is defined. Hereinafter, the report ID corresponding to the structure of the touch data may be referred to as "input report ID" and the report ID corresponding to the feature may be referred to as "feature report ID." Parts of the descriptor each corresponding to any one of the plural input report IDs may each be referred to as "report descriptor," and parts of the descriptor each corresponding to any one of the plural feature report IDs may each be referred to as "feature descriptor."

As to the report descriptor, the sensor controller 20 selects one input report ID corresponding to the pointer currently detected, and produces the touch data in accordance with the selected input report ID. The sensor controller 20 performs transmission of the touch data to the operating system 40 in the format of a report that includes the selected input report ID and the produced touch data.

On the other hand, as to the feature descriptor, at an optional timing after the descriptor is notified of, an inquiry regarding the specific content of the feature is performed from the operating system 40 to the sensor controller 20. The specific content of the feature is thereby notified of to the operating system 40. The operating system 40 also performs a process of setting the specific content of the feature in the sensor controller 20.

These processes performed between the sensor controller 20 and the operating system 40 will be described below in more detail with reference to a sequence diagram of the serial communication system 1.

Figure 3:
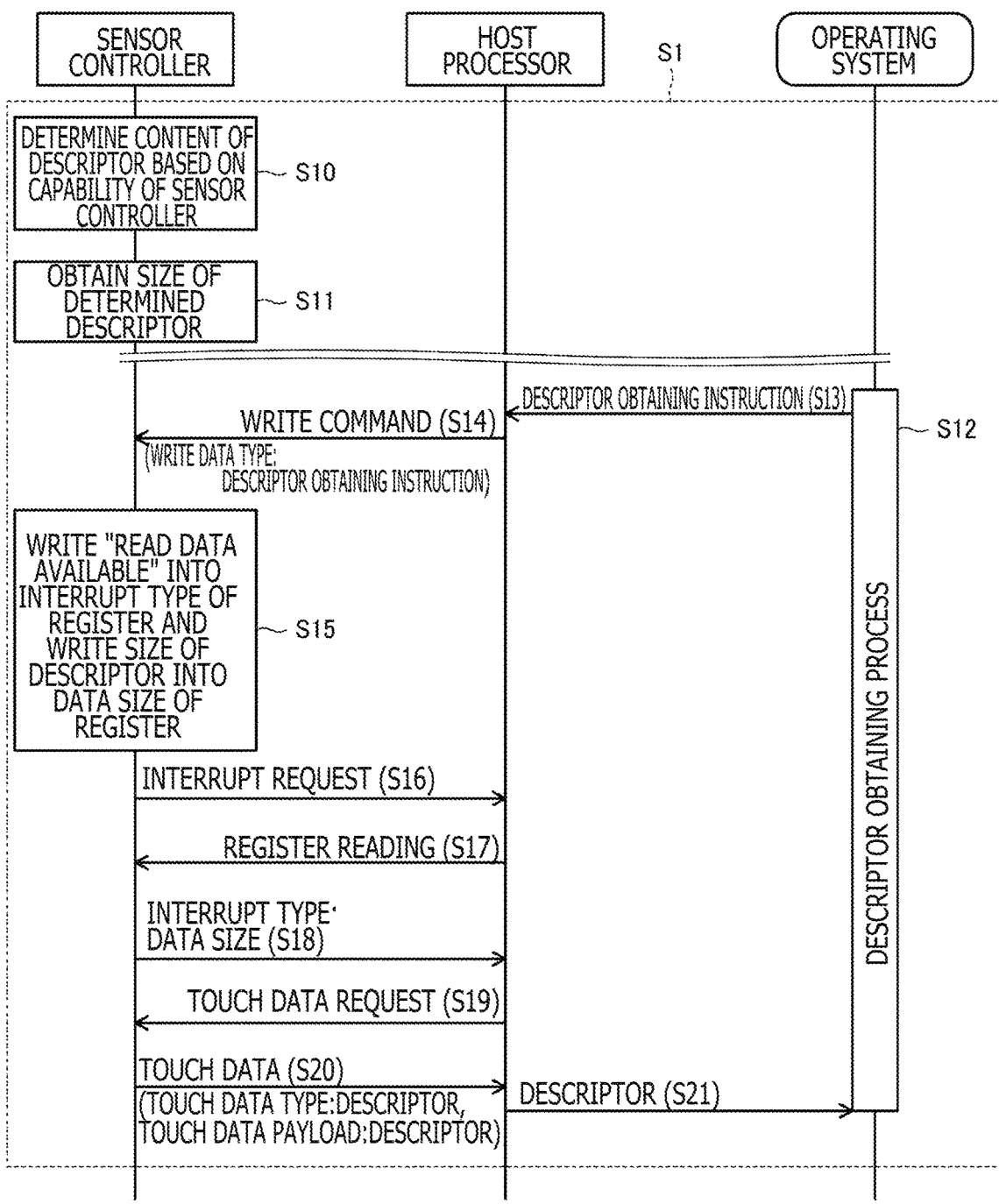
FIG. 3 is a diagram depicting a sequence of serial communications (a descriptor notification sequence) performed by the serial communication system 1 depicted in FIG. 1.

FIG. 3 is a diagram depicting a descriptor notification sequence S1 performed by the serial communication system 1.

Sensor controller 20 first determines the content of the descriptor based on the capability of the sensor controller 20 (S10). The specific content of the descriptor determined in this manner is as described with reference to FIG. 2. The capability of the sensor controller 20 includes a stylus detection function, a determination function as to items such as whether sensor information regarding the stylus including sensor information regarding an inertia sensor can be interpreted, a function set (or removed) by a firmware, and the like.

The sensor controller 20 already determining the content of the descriptor next obtains the size of the determined descriptor (S11), and temporarily stores the size together with the descriptor in the memory 22 depicted in FIG. 1.

The operating system 40 starts a descriptor obtaining process at an optional timing (such as, for example, a timing immediately after the connection with the sensor controller 20) (S12). In this process, the operating system 40 transmits a descriptor obtaining instruction (Get Descriptor) to the host processor 30 (S13).

The host processor 30 having the descriptor obtaining instruction received therein issues a write command that includes data indicating the request for the descriptor to the sensor controller 20 (S14 write command issuance). Concerning the above, the reason why the write command is used is that any command to read any large-capacity data like the descriptor is not prepared in the communication standard that is used for the communication between the host processor 30 and the sensor controller 20 (in addition, though the details will be described later, a command to read a small-capacity register value is prepared).

Figure 4:
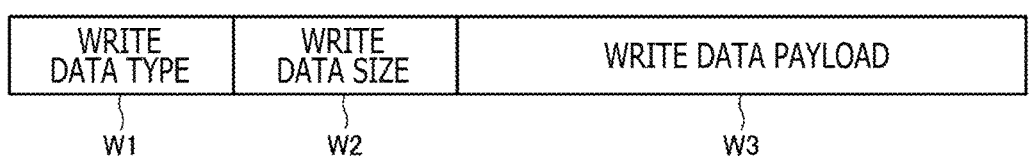
FIG. 4 is a diagram depicting the structure of a write command transmitted at S14 depicted in FIG. 2.

FIG. 4 is a diagram depicting the structure of the write command transmitted at S14. As depicted in FIG. 4, the write command includes three fields of a write data type W1, a write data size W2, and a write data payload W3. The write data type W1 is the field storing therein the value that represents the type of the data to be written, the write data payload W3 is the field storing therein the data to be written, and the write data size W2 is the field setting therein the data size of the write data payload W3.

The size of the write data type W1 is 1 byte (the smallest size assigned to one piece of data) while not all the 1 byte needs to be used as the value representing the type of the data to be written. In this embodiment, an unused value (such as, for example, 7) of the values corresponding to 1 byte capable of being set in the write data type W1 ("0" to "255") is therefore used as the value representing a descriptor obtaining instruction (GET_REPORT_DESCRIPTOR). In short, the host processor 30 issues the write command that includes the data indicating the request of the descriptor by storing this value representing the descriptor obtaining instruction (GET_REPORT_DESCRIPTOR) in the write data type W1 in the write command. In addition, at S14, the setting content of the write data payload W3 is optional. The relaying of the descriptor obtaining instruction is thereby realized from the host processor 30 to the sensor controller 20 using the write command that originally is used for writing of data.

In this regard, the item transmitted at S14 is absolutely a write command and any mechanism to transmit the descriptor from the sensor controller 20 to the operating system 40 does not therefore accompany this item. The sensor controller 20 therefore performs the transmission of the descriptor using the mechanism to transmit the touch data at S15 to S21 described below.

To describe in detail, the sensor controller 20 first performs a predetermined process for the write command received at S14 (S15). This process includes a process performed for a register arranged in the memory 22 depicted in FIG. 1.

FIG. 5 is a diagram depicting the data structure of the register arranged in the memory 22. As depicted in FIG. 5, this register includes a field storing therein an interrupt type (a field for 4 bits that are for addresses k to k+3) and a field storing therein the size of the data transmitted following the interrupt (a field for 24 bits that are for addresses m to m+23). At S15, the sensor controller 20 writes the value that indicates "read data available (read_data_available)" (the register value representing that the touch data becomes transmittable) into the former and writes the size of the descriptor obtained at S11 in the latter.

The sensor controller 20 next transmits the interrupt to the host processor 30 (S16, interrupt transmission). The host processor 30 receiving this performs reading from the register of the sensor controller 20, triggered by the fact that the interrupt is detected (S17). The data read in this process is the interrupt type and the data size depicted in FIG. 5. As the result of the process at S17, the interrupt type and the data size are therefore transmitted from the sensor controller 20 to the host processor 30 (S18).

The host processor 30 receiving the interrupt type and the data size at S18 requests the sensor controller 20 to transmit the touch data (S19. A touch data request). Concerning the above, the reason why the host processor 30 requests the touch data is that the series of processes starting with the interrupt are the processes that are prepared to transmit the touch data. In other words, the host processor 30 only simply performs the relay process for the touch data without checking whether the content of the touch data to be received from now is the descriptor or the touch data.

In response to the reception of the transmission request for the touch data at S19, the sensor controller 20 next transmits the touch data that includes the descriptor determined at S10 (S20, descriptor response).

FIG. 6 is a diagram depicting the structure of the touch data transmitted at S20. As depicted in FIG. 6, the touch data includes three fields of a touch data type T1, a touch data size T2, and a touch data payload T3. The touch data type T1 is a field storing therein the value that represents the type of the touch data to be transmitted, the touch data payload T3 is a field storing therein the data to be transmitted, and the touch data size T2 is a field setting therein the data size of the touch data payload T3.

The sensor controller 20 is configured to store the descriptor in the touch data payload T3 and store the size of the descriptor obtained at S11 in the touch data size T2. The sensor controller 20 stores the value representing that the touch data is to transmit the descriptor (TOUCH_DATA_TYPE_REPORT_DESCRIPTOR) in the touch data type T1.

The host processor 30 receiving the touch data at S20 extracts the data in the touch data payload T3 based on the size stored in the touch data size T2, and transfers the data to the operating system 40 without checking whether the extracted data is the descriptor (S21). The transmission of the descriptor from the sensor controller 20 to the operating system 40 is thereby completed.

As described above, according to this embodiment, the data indicating the request for the descriptor is arranged in the write command issued by the host processor 30 to the sensor controller 20 and the sensor controller 20 receiving this transmits the descriptor using the transmission procedure for the touch data. The notification of the descriptor is therefore enabled from the sensor controller 20 to the operating system 40 as in Non-Patent Document 1 and Non-Patent Document 2 even in the case where the communication between the sensor controller 20 and the host processor 30 is performed in accordance with the standard that does not provide any command usable for the notification or the reading of the descriptor.

Figure 7:
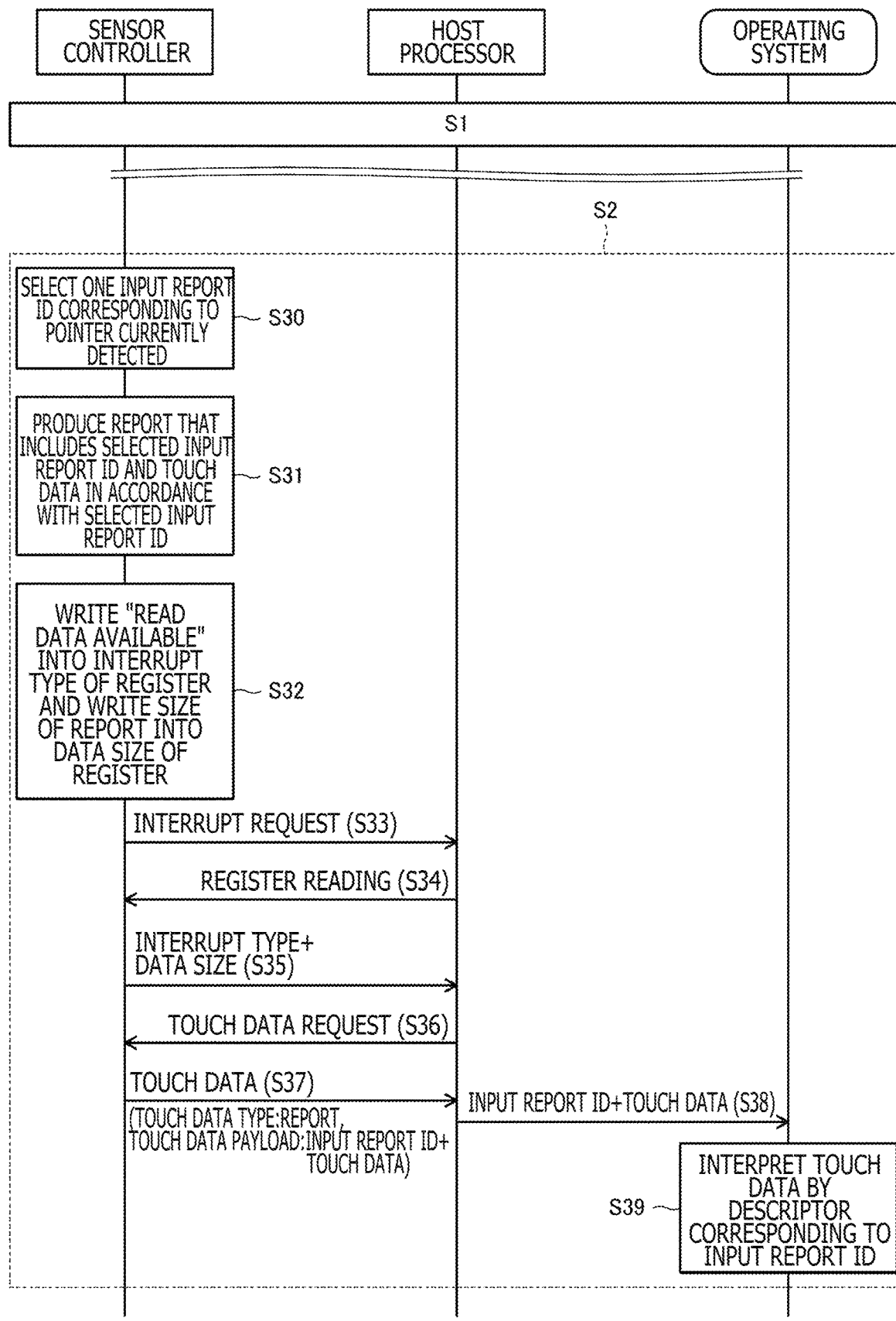
FIG. 7 is a diagram depicting a sequence of serial communications (a touch data transmission sequence) performed by the serial communication system 1 depicted in FIG. 1.

FIG. 7 is a diagram depicting a touch data transmission sequence S2 performed by the serial communication system 1. As depicted in FIG. 7, the touch data transmission sequence S2 is performed after the descriptor notification sequence S1 depicted in FIG. 3 comes to an end (that is, after the operating system 40 receives the notification of the descriptor from the sensor controller 20). Furthermore, the transmission of the touch data is a process that is regularly performed. Though not depicted, the touch data transmission sequence S2 is therefore repeatedly performed at predetermined time intervals.

The sensor controller 20 first selects one input report ID in accordance with a pointer currently detected (such as, for example, the pointer 50 or the pointer 51 depicted in FIG. 1)

from one or more input report IDs included in the descriptor notified of to the operating system 40 at the descriptor notification sequence S1 (S30). The sensor controller 20 performs production of a report that includes the selected input report ID and the touch data, in accordance with a report descriptor that corresponds to the selected input report ID (S31).

Regarding the above, the input report ID selected at S30 may be changed even in the time period for the same pointer to continuously be detected. In short, when the detection of a certain pointer is started, the sensor controller 20 at first does not know the type of the data supported by the pointer and therefore selects, for example, input report IDs of the report descriptors that corresponds to all possible pieces of data. After the data supported by the pointer is made clear through communication with the pointer, the sensor controller 20 can select the input report ID of the report descriptor that corresponds to only the data supported by the pointer. The capacity of the touch data can flexibly be varied when necessary even for the same pointer, by performing as above.

Reference back to the sequence of FIG. 7, the sensor controller 20 already producing the report writes the value that represents "read data available (read_data_available)" (the register value representing that the touch data becomes transmittable) into the field that stores therein the interrupt type depicted in FIG. 5, and writes the size of the report to be transmitted, into the field that stores therein the data size (S32).

The sensor controller 20 next transmits the interrupt to the host processor 30 (S33). The processes from S33 to the touch data request by the host processor 30 (S36) (S33 to S36) are similar to those of S17 to S19 depicted in FIG. 3. To simply describe, the host processor 30 receiving the interrupt reads the interrupt type and the data size from the register of the sensor controller 20, triggered by the fact that the interrupt is detected (S34). As the result of S34, the interrupt type and the data size are transmitted from the sensor controller 20 to the host processor 30 (S35, size designation). The host processor 30 having these received therein requests the sensor controller 20 to transmit the touch data (S36).

The sensor controller 20 receiving the request for the transmission of the touch data at S36 performs transmission of the report produced at S31 (S37, report transmission). More specifically, the sensor controller 20 stores the report produced at S31 in the touch data payload T3 depicted in FIG. 6, stores the size of this report in the touch data size T2 depicted in FIG. 6, and stores the value representing that the touch data is to transmit the report including the touch data (TOUCH_DATA_TYPE_HID_REPORT) in the touch data type T1 depicted in FIG. 6, and thereby produces the touch data and transmits the touch data to the host processor 30.

The host processor 30 receiving the touch data at S37 extracts the data in the touch data payload T3 in accordance with the size stored in the touch data size T2, and transmits the data to the operating system 40 (S38). The report including the input report ID and the touch data is thereby transmitted from the sensor controller 20 to the operating system 40.

The operating system 40 reads the report descriptor that corresponds to the received input report ID, from the descriptor received in the descriptor notification sequence S1. The operating system 40 performs interpretation (Decompose) of the received touch data using the read report descriptor (S39).

As described above, according to this embodiment, the sensor controller 20 can produce a report using a report descriptor that corresponds to the detected pointer (or the state of understanding of the data supported by the pointer). In short, because the report size can be varied as necessary, reduction of the capacity of the report including the touch data is enabled. Because the input report ID is also transmitted together with the touch data, the operating system 40 can correctly interpret the touch data and can extract each individual data included therein.

In addition, at S38, the host processor 30 extracts the data in the touch data payload T3 in accordance with the size stored in the touch data size T2 while the host processor 30 may extract the data in the touch data payload T3 in accordance with the data size received at S35. In this case, because the touch data size T2 can be omitted, the capacity of the report including the touch data can further be reduced. For this point, the same is applied to S21 depicted in FIG. 3 and S50 depicted in FIG. 8 described later.

For the processes performed by the sensor controller 20 will again be described from another viewpoint, with reference to the case where two types of report descriptor are present.

In this case, S20 depicted in FIG. 3 is where a first report descriptor representing a first structure of the touch data and a second report descriptor representing a second structure of the touch data that is different from the first structure are transmitted as the descriptor. In addition to the first and the second report descriptors, the descriptor includes a first report ID that corresponds to the first report descriptor and a second report ID that corresponds to the second report descriptor.

At S37 depicted in FIG. 6, a process is performed for the sensor controller 20 to transmit one of the first report including the touch data of the first structure and the first report ID and the second report including the touch data of the second structure and 21 report IDs to the host processor 30 in accordance with the function type of the detected pointer (such as, for example, an active stylus).

As above, according to this embodiment, two types of report descriptors can each be properly used in accordance with the function type of the detected pointer. To more specifically describe, at the time point at which the sensor controller 20 detects that the sensor controller 20 is connected to the host processor 30 and transmits the report descriptor to the host processor 30 (at the time point of the enumeration), the sensor controller 20 does not know which one of a stylus #1 or a stylus #2 comes or does not come on the electrodes 11 in the future. The sensor controller 20 therefore transmits both of the two types of report descriptor (corresponding to the overall capability of the sensor controller 20) that may each be used from now (that is, the first report descriptor for the stylus #1 and the second report descriptor for the stylus #2) to the host processor 30 and notifies the host processor 30 thereof. When a stylus is thereafter actually detected, the sensor controller 20 determines which one of the stylus #1 or #2 the detected stylus is, selects one of the first and the second report descriptors in accordance with the result of the determination, and transmits the report that includes the report ID of the selected report descriptor. Performing this enables the optimal report descriptor to be used in accordance with the type of the stylus. Not making any detailed description, the same is applied to the case where three or more types of report descriptor are each properly used.

Figure 8:
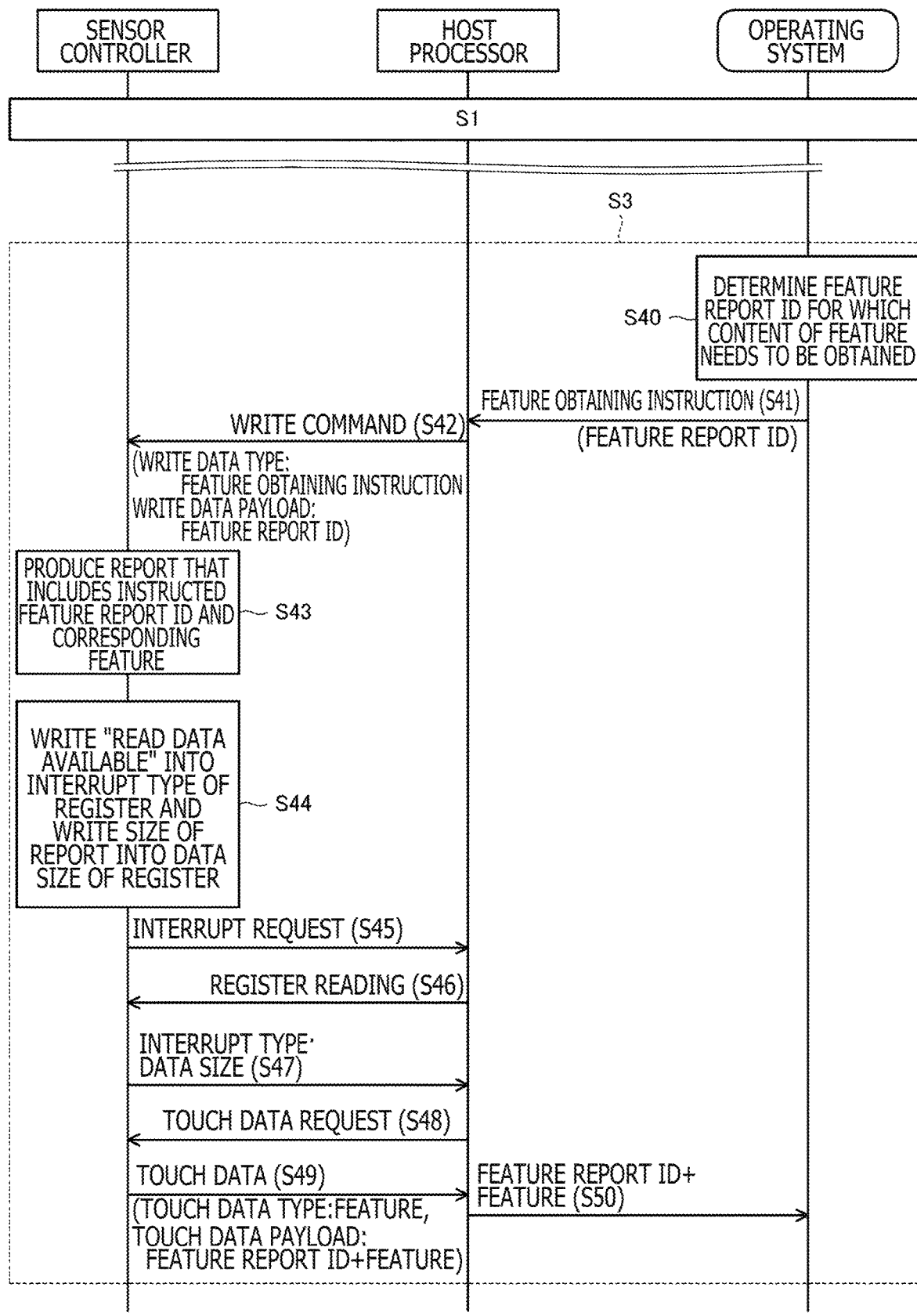
FIG. 8 is a diagram depicting a sequence of the serial communications (a feature obtaining sequence) performed by the serial communication system 1 depicted in FIG. 1.

FIG. 8 is a diagram depicting a feature obtaining sequence S3 performed by the serial communication system 1. This feature obtaining sequence S3 is also performed after the descry ptor notification sequence S1 depicted in FIG. 3 comes to an end (that is, after the operating system 40 receives the notification of the descriptor from the sensor controller 20). The feature obtaining sequence S3 is typically conducted once for each of the one or more feature report IDs included in the descriptor notified from the sensor controller 20 to the operating system 40.

At first, the operating system 40 determines the feature report ID of which the content of the feature needs to be obtained (S40). The processes performed thereafter are basically same as the processes performed at and after S13 of the descriptor notification sequence S1 depicted in FIG. 3. The processes performed at and after S41 will therefore be described below properly avoiding repeated description.

The operating system 40 transmits a feature obtaining instruction (Get Features) that includes the determined feature report ID to the host processor 30 (S41). The host processor 30 receiving this issues a write command that includes the data indicating the obtaining request for the feature, for the sensor controller 20 (S42). More specifically, the host processor 30 stores the value representing the feature obtaining instruction (GET_FEATURES_DATA) in the write data type W1 in the write command, stores the feature report ID included in the feature obtaining instruction from the operating system 40 in the write data payload W3, and stores the size of the write data payload W3 in the write data size W2, and thereby issues the write command that includes the data indicating the obtaining request for the feature. The relaying of the feature obtaining instruction is thereby realized from the host processor 30 to the sensor controller 20 using the write command that originally is used for writing of data.

The sensor controller 20 performs a predetermined process for the write command received at S42 (S43 and S44). More specifically, the sensor controller 20 first produces a report that includes the feature report ID included in the write data payload W3 and the feature corresponding to this feature report ID (S43). The sensor controller 20 next writes the value representing "read data available (read_data_available)" into the field storing therein the interrupt type depicted in FIG. 5, and writes the size of the report to be transmitted into the field storing therein the data size (S44).

The sensor controller 20 thereafter transmits the interrupt to the host processor 30 (S45). The processes from S45 to the touch data request by the host processor 30 (S48) (S45 to S48) are same as those at S17 to S19 depicted in FIG. 3. To simply describe, the host processor 30 receiving the interrupt reads the interrupt type and the data size from the register of the sensor controller 20, triggered by the detection of the interrupt (S46). As a result of the process of S34, the interrupt type and the data size are transmitted from the sensor controller 20 to the host processor 30 (S47). The host processor 30 receiving these requests the sensor controller 20 to transmit the touch data (S48).

The sensor controller 20 receiving the request for the transmission of the touch data at S48 performs the transmission of the report produced at S43 (S49). More specifically, the sensor controller 20 stores the report produced at S43 in the touch data payload T3 depicted in FIG. 6, stores the size of this report in the touch data size T2 depicted in FIG. 6, and stores the value representing that the touch data is to transmit the report including the feature (TOUCH_DATA_TYPE_GET_FEATURES) in the touch data type T1 depicted in FIG. 6, and thereby produces the touch data and transmits the touch data to the host processor 30.

The host processor 30 receiving the touch data at S49 extracts the data in the touch data payload T3 in accordance with the size stored in the touch data size T2 and transfers the data to the operating system 40 (S50). The report including the feature report ID and the feature is thereby transmitted from the sensor controller 20 to the operating system 40. The operating system 40 obtains and stores the feature received in this manner as the feature that corresponds to the received feature report ID.

As described above, according to this embodiment, the feature can be transmitted from the sensor controller 20 to the operating system 40 even in the case where the communication between the sensor controller 20 and the host processor 30 is performed in accordance with a standard that does not provide any command usable for the notification of the feature because the data indicating the request for the feature is arranged in the write command issued by the host processor 30 to the sensor controller 20 and the sensor controller 20 receiving this transmits the feature using the transmission procedure for the touch data.

Figure 9:
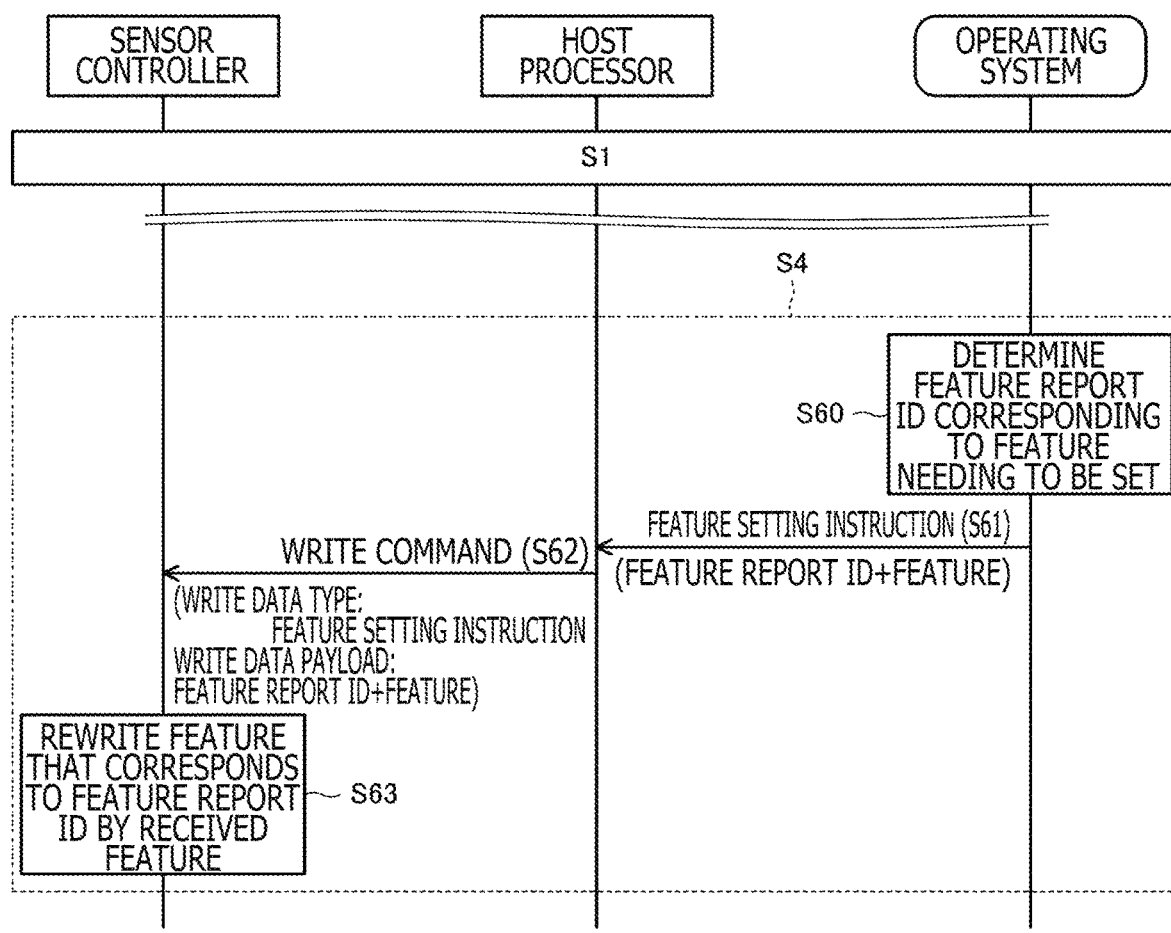
FIG. 9 is a diagram depicting a sequence of the serial communications (a feature setting sequence) performed by the serial communication system 1 depicted in FIG. 1.

FIG. 9 is a diagram depicting a feature setting sequence S4 performed by the serial communication system 1. This feature setting sequence S4 is also performed after the descriptor notification sequence S1 depicted in FIG. 3 comes to an end (that is, after the operating system 40 receives the notification of the descriptor from the sensor controller 20).

The operating system 40 first determines the feature necessary to be set and determines the feature report ID that corresponds to the feature from the one or more feature report IDs included in the descriptor (S60). The operating system 40 next transmits a feature setting instruction including the determined feature report ID and the content of the feature to be set (Set Features) to the host processor 30 (S61).

The host processor 30 receiving this feature setting instruction issues a write command that includes data indicating the setting request for the feature, to the sensor controller 20 (S62). More specifically, the host processor 30 stores the value representing the feature setting instruction (SET_FEATURES_DATA) in the write data type W1 in the write command, stores the feature report ID and the content of the feature to be set included in the feature setting instruction from the operating system 40 in the write data payload W3, and stores the size of the write data payload W3 in the write data size W2, and thereby issues the write command that includes the data indicating the setting request for the feature. The relaying of the feature setting instruction is thereby realized from the host processor 30 to the sensor controller 20. In essence, this instruction is a write instruction for the feature and it can therefore be stated that the write command is used in its original use.

The sensor controller 20 receiving the write command at S62 rewrites the feature corresponding to the feature report ID included in the write command, with the received feature (S63). The setting of the feature of the sensor controller 20 by the operating system 40 is thereby completed.

As described above, according to this embodiment, the setting is enabled for the feature of the sensor controller 20 from the operating system 40.

The preferred embodiment of the present disclosure has been described as above while the present disclosure is not limited at all by this embodiment and the present disclosure can naturally be implemented in various aspects within the scope not departing from the gist thereof. The present disclosure is widely applicable to devices or communication methods that each execute serial communication for touch data between a sensor controller that detects a pointed position of a pointer such as a finger or a stylus (including an active stylus), and a host.

DESCRIPTION OF REFERENCE SYMBOLS

1 Serial communication system
10 Touch sensor
11 Electrode
20 Sensor controller
21 Terminal
22 Memory
30 Host processor
40 Operating system
50, 51 Pointer
100 Descriptor

The invention claimed is:

1. A serial communication method performed by a device that detects a coordinate of a stylus and that reports touch data including the detected coordinate to a host, the serial communication method comprising:
receiving, from the host, a write command that includes data indicating a request for a descriptor;
transmitting, to the host, an interrupt in response to the receiving of the write command;
receiving, from the host, a touch data transmission request, after the transmitting of the interrupt;
transmitting, to the host, the descriptor, in response to the receiving of the touch data transmission request from the host, wherein the descriptor includes one or more report identifiers (IDs) and one or more report descriptors that each correspond to one of the one or more report IDs;
producing the touch data including the detected coordinate and a first report including a first report ID of the one or more report IDs, in accordance with a first report descriptor corresponding to the first report ID;
transmitting, to the host, data indicating a size of the first report; and
transmitting, to the host, the first report.

2. The serial communication method according to claim 1, wherein:
the transmitting of the interrupt is after the receiving of the write command and before the transmitting of the descriptor.

3. The serial communication method according to claim 2, wherein:
the transmitting of the descriptor includes transmitting the descriptor using a field of the touch data.

4. The serial communication method according to claim 1, further comprising:
enabling the host to read, from a register of the device, a register value indicating that the touch data becomes transmittable, after the transmitting of the interrupt.

5. The serial communication method according to claim 1, further comprising, after the transmitting of the descriptor and before the transmitting of the data indicating the size of the first report:
retransmitting, to the host, the interrupt,
wherein the transmitting of the data indicating the size of the first report is after a register value representing the size of the first report is read from a register of the device.

6. The serial communication method according to claim 1, wherein:
the descriptor includes the first report descriptor representing a first structure of the touch data and a second report descriptor representing a second structure of the touch data that is different from the first structure, and
the serial communication method further comprises:
transmitting, to the host, the first report including the touch data of the first structure or a second report including the touch data of the second structure, in accordance with a function type of the detected stylus.

7. The serial communication method according to claim 6, wherein:
the descriptor includes the first report ID in association with the first report descriptor and also includes a second report ID in association with the second report descriptor, and
the second report includes the second report ID.

8. The serial communication method according to claim 1, wherein:
the descriptor includes data that indicates a format of a feature of the device.

9. The serial communication method according to claim 1, further comprising:
transmitting, to the host, the touch data with the interrupt as a trigger.

10. The serial communication method according to claim 1, wherein:
the stylus is an active stylus.

11. A sensor controller that detects a coordinate of a stylus and that reports touch data including the detected coordinate to a host, the sensor controller comprising:
a terminal connected to plural electrodes;
a processor; and
a memory storing a program that, when executed by the processor, causes the sensor controller to:
receive, from the host, a write command including data that indicates a request for a descriptor;
transmit, to the host, an interrupt, in response to the write command being received;
receive, from the host, a touch data transmission request, after the interrupt is transmitted;
transmit, to the host, the descriptor, in response to the touch data transmission request being received, wherein the descriptor includes one or more report identifiers (IDs) and one or more report descriptors that each correspond to one of the one or more report IDs;
produce the touch data including the detected coordinate and a first report including a first report ID of the one or more report IDs, in accordance with a first report descriptor corresponding to the first report ID;
transmit, to the host, data indicating a size of the first report; and
transmit, to the host, the first report.

12. The sensor controller according to claim 11, wherein:
the program, when executed by the processor, causes the sensor controller to transmit the interrupt after the write command is received and before the descriptor is transmitted.

13. The sensor controller according to claim 11, wherein:
the program, when executed by the processor, causes the sensor controller to transmit, to the host, the descriptor using a field of the touch data.

14. The sensor controller according to claim 11, wherein:
the program, when executed by the processor, causes the sensor controller to enable the host to read a register value indicating that the touch data becomes transmittable, from a register of the sensor controller, after the interrupt is transmitted.

15. The sensor controller according to claim 11, wherein:

the program, when executed by the processor, causes the sensor controller to retransmit, to the host, the interrupt, after the descriptor is transmitted and before data indicating the size of the first report is transmitted, wherein the data indicating the size of the first report is transmitted after a register value representing the size of the first report is read from a register of the sensor controller.

16. The sensor controller according to claim 11, wherein:

the descriptor includes the first report descriptor representing a first structure of the touch data and a second report descriptor representing a second structure of the touch data that is different from the first structure, and the program, when executed by the processor, causes the sensor controller to transmit, to the host, the first report including the touch data of the first structure or a second report including the touch data of the second structure, in accordance with a function type of the detected stylus.

17. The sensor controller according to claim 16, wherein:

the descriptor includes the first report ID in association with the first report descriptor and also includes a second report ID in association with the second report descriptor, and the second report includes the second report ID.

18. The sensor controller according to claim 11, wherein:

the descriptor includes data that indicates a format of a feature of the sensor controller.

19. The sensor controller according to claim 11, wherein:

the program, when executed by the processor, causes the sensor controller to transmit, to the host, the touch data with the interrupt as a trigger.

20. The sensor controller according to claim 11, wherein:

the stylus is an active stylus.

\* \* \* \* \*